(12) United States Patent
Lish et al.

(10) Patent No.: US 9,047,380 B1
(45) Date of Patent: Jun. 2, 2015

(54) TECHNIQUE FOR DETERMINING KEYWORDS FOR A DOCUMENT

(75) Inventors: David F. Lish, Burlingame, CA (US);
Christopher H. J. Whittam, Hillsborough, CA (US); Indraneel Bhattacharyya, San Diego, CA (US); Joe T. Callinan, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 258 days.

(21) Appl. No.: 12/650,874

(22) Filed: Dec. 31, 2009

(51) Int. Cl.
*G06F 17/30* (2006.01)

(52) U.S. Cl.
CPC .............................. *G06F 17/30867* (2013.01)

(58) Field of Classification Search
USPC .......................................................... 707/708
See application file for complete search history.

(56) References Cited

U.S. PATENT DOCUMENTS

| | | | |
|---|---|---|---|
| 8,321,274 B2 * | 11/2012 | Collins et al. ............... | 705/14.43 |
| 8,321,448 B2 * | 11/2012 | Zeng et al. .................... | 707/767 |
| 8,392,249 B2 * | 3/2013 | Koningstein et al. ...... | 705/14.41 |
| 2005/0038894 A1 * | 2/2005 | Hsu et al. ...................... | 709/228 |
| 2007/0143176 A1 * | 6/2007 | Nong et al. .................... | 705/14 |
| 2007/0220037 A1 * | 9/2007 | Srivastava et al. ............ | 707/102 |
| 2007/0226202 A1 * | 9/2007 | Cava ................................ | 707/4 |
| 2007/0239713 A1 * | 10/2007 | Leblang et al. .................... | 707/6 |
| 2008/0077585 A1 * | 3/2008 | Li et al. .............................. | 707/6 |
| 2008/0249842 A1 * | 10/2008 | Lee et al. ........................ | 705/10 |
| 2009/0299998 A1 * | 12/2009 | Kim ................................. | 707/5 |
| 2010/0223125 A1 * | 9/2010 | Spitkovsky ................ | 705/14.42 |

OTHER PUBLICATIONS

Chen et al. Advertising Keyword Suggestion Based on Concept Hierarchy, ACM 2008.*

* cited by examiner

*Primary Examiner* — Kevin L Young
(74) *Attorney, Agent, or Firm* — Park, Vaughan, Fleming & Dowler LLP; Steven E. Stupp (57) ABSTRACT

A technique for providing one or more keywords associated with a document (such as a web page) is described. In this technique, a set of user-selected keywords and a specification of a market segment associated with the document are received from a user. In response, a set of similar keywords (which can include one or more of the set of user-selected keywords) is determined based on the user-selected keywords. Furthermore, a market-specific set of keywords (which can also include one or more of the set of user-selected keywords and/or the set of similar keywords) is selected based on the set of similar keywords by using keywords for documents that are associated with other users in the market segment. Then, at least a subset of the set of market-specific keywords is provided to the user.

18 Claims, 5 Drawing Sheets

```
                                                                          ┌─ 100
┌─────────────────────────────────────────────────────────────────┐
│  RECEIVE A SET OF USER-SELECTED KEYWORDS AND A SPECIFICATION OF A│
│     MARKET SEGMENT ASSOCIATED WITH A DOCUMENT FROM A USER       │
│                             110                                 │
└─────────────────────────────────────────────────────────────────┘
                               │
                               ▼
┌─────────────────────────────────────────────────────────────────┐
│  DETERMINE A SET OF SIMILAR KEYWORDS BASED ON THE USER-SELECTED │
│   KEYWORDS, WHERE THE SET OF SIMILAR KEYWORDS CAN INCLUDE ONE   │
│         OR MORE OF THE SET OF USER-SELECTED KEYWORDS            │
│                             112                                 │
└─────────────────────────────────────────────────────────────────┘
                               │
                               ▼
┌─────────────────────────────────────────────────────────────────┐
│   SELECT A MARKET-SPECIFIC SET OF KEYWORDS BASED ON THE SET OF  │
│  SIMILAR KEYWORDS BY USING KEYWORDS FOR DOCUMENTS THAT ARE      │
│      ASSOCIATED WITH OTHER USERS IN THE MARKET SEGMENT          │
│                             114                                 │
└─────────────────────────────────────────────────────────────────┘
                               │
                               ▼
┌─────────────────────────────────────────────────────────────────┐
│         PROVIDE AT LEAST A SUBSET OF THE SET OF MARKET-SPECIFIC │
│                       KEYWORDS TO THE USER                      │
│                             116                                 │
└─────────────────────────────────────────────────────────────────┘
                               │
                               ▼
┌─────────────────────────────────────────────────────────────────┐
│  RECEIVE USER SELECTIONS OF KEYWORDS IN AT LEAST THE SUBSET OF  │
│  THE SET OF MARKET-SPECIFIC KEYWORDS TO ASSOCIATE WITH THE      │
│                           DOCUMENT                              │
│                          (OPTIONAL)                             │
│                             118                                 │
└─────────────────────────────────────────────────────────────────┘
                               │
                               ▼
┌─────────────────────────────────────────────────────────────────┐
│ MODIFY WEIGHTS OF THE KEYWORDS ASSOCIATED WITH THE DOCUMENTS    │
│           BASED ON THE RECEIVED USER SELECTIONS                 │
│                          (OPTIONAL)                             │
│                             120                                 │
└─────────────────────────────────────────────────────────────────┘
```

TECHNIQUE FOR DETERMINING KEYWORDS FOR A DOCUMENT

BACKGROUND

The present disclosure relates to techniques for determining keywords associated with a document.

As the number of web pages on the Internet continues to increase, search engines are becoming increasingly important in directing customer traffic to specific web pages. For example, in response to a customer query, a search engine may generate a search expression that includes synonyms and paraphrases of the customer query, as well as logical permutations of the positions of the words in the search query. This search expression is compared against information in a set of crawled web pages from the Internet to identify the web pages that are most relevant to the search query to produce a set of search results. In particular, the search results are usually the top web pages in a ranking of match scores that are associated with the set of web pages. These match scores measure the agreement between the search expression and information in the set of web pages.

A variety of factors are typically considered when generating a match score for a given web page. Among these are keywords associated with the web page (which are sometimes referred to as 'adwords'). As a consequence, the choice of the keywords associated with the given web page can have a significant impact on the ranking of the given web page in the search results and, thus, on the amount of customer traffic that is driven to the given web page.

However, choosing suitable keywords for a web page can be difficult. For example, while many search-engine providers offer services to assist an owner of the given web page in choosing suitable keywords, these tools often return a large number of possible keywords (such as more than 100,000 keywords). Reviewing such a large list of keywords can be time consuming. This problem is compounded by the uncertainty about which keywords are likely to provide the best results (in terms of web-page traffic) at a reasonable price. In particular, the cost of purchasing the right to use popular keywords can be prohibitive for most web-page owners.

SUMMARY

One embodiment of this disclosure relates to a computer system that provides one or more keywords associated with a document. During operation, the computer system receives a set of user-selected keywords and a specification of a market segment associated with the document from a user. Then, the computer system determines a set of similar keywords based on the user-selected keywords, where the set of similar keywords can include one or more of the set of user-selected keywords. The computer system also selects a market-specific set of keywords based on the set of similar keywords by using keywords for documents that are associated with other users in the market segment, where the market-specific set of keywords can include one or more of the user-selected keywords and the set of similar keywords. Next, the computer system provides at least a subset of the set of market-specific keywords to the user.

Note that the document may include one or more web pages. Furthermore, the set of similar keywords may include synonyms of, or words that are related to, the set of user-selected keywords.

In some embodiments, determining the set of similar keywords involves performing a filtering operation in which N top-ranked keywords in the set of similar keywords are used in subsequent operations in the method. Alternatively or additionally, determining the set of similar keywords may involve calculating competitiveness scores of the set of similar keywords. For example, a given competitiveness score of a given keyword in the set of similar keywords may be based on a number of users that pay to be associated with the given keyword during searches for documents on a network. Furthermore, calculating the competitiveness scores may involve performing a filtering operation in which keywords in the set of similar keywords that have competitiveness scores in a range of values are used in subsequent operations in the method, where a maximum or a minimum of the competitiveness scores in the range of values is other than a maximum or minimum possible competitiveness score. This filtering operation may reduce a cost of purchasing keywords in at least the set of similar keywords.

Note that the set of market-specific keywords may include N top-ranked keywords in the set of market-specific keywords.

In some embodiments, the computer system receives user selections of keywords in at least the subset of the set of market-specific keywords to associate with the document. These user selections may facilitate a search-engine-determined ranking of the document in response to a search query from another user. Furthermore, the computer system may modify weights of the keywords associated with the documents based on the received user selections.

Another embodiment provides a method that includes at least some of the operations performed by the computer system.

Another embodiment provides a computer-program product for use with the computer system. This computer-program product includes instructions for at least some of the operations performed by the computer system.

BRIEF DESCRIPTION OF THE FIGURES

Table 1 provides a set of similar keywords that are generated in response to keywords provided by a user in accordance with an embodiment of the present disclosure.

Table 2 provides a set of market-specific keywords that are selected based on the set of similar keywords in Table 1 in accordance with an embodiment of the present disclosure.

Table 3 provides a subset of the set of market-specific keywords in Table 2 that are presented to the user in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

Embodiments of a computer system, a technique for providing one or more keywords associated with a document (such as a web page), and a computer-program product (e.g., software) for use with the computer system are described. In this technique, a set of user-selected keywords and a specification of a market segment associated with the document are received from a user. In response, a set of similar keywords (which can include one or more of the set of user-selected keywords) is determined based on the user-selected keywords. Furthermore, a market-specific set of keywords (which can also include one or more of the set of user-selected keywords and/or the set of similar keywords) is selected based on the set of similar keywords using keywords associated with documents that are associated with other users in the market segment. Then, at least a subset of the set of market-specific keywords is provided to the user.

By providing at least the subset of the set of market-specific keywords to the user, this technique solves the problem of choosing suitable keywords for use with the document. In particular, the subset of the set of market-specific keywords are selected for the user such that these keywords are relevant to the user's document and are cost effective, without requiring user expertise in search-engine optimization. Consequently, the technique may reduce the time and effort needed to choose suitable keywords, and may allow the user to increase the visibility of the document on a network in search-engine results (e.g., the technique may increase the ranking of the document). These higher rankings may result in increased customer traffic to the document and, thus, increased revenue for the user. Therefore, the technique may facilitate commerce.

In the discussion that follows, one or more web pages are used as an illustrative example of the document. However, this technique may be used with a wide variety of documents, including: text documents, files associated with word-processing software, files associated with a spreadsheet, files associated with presentation software, audio files, video files, and/or animation files.

Figure 1:
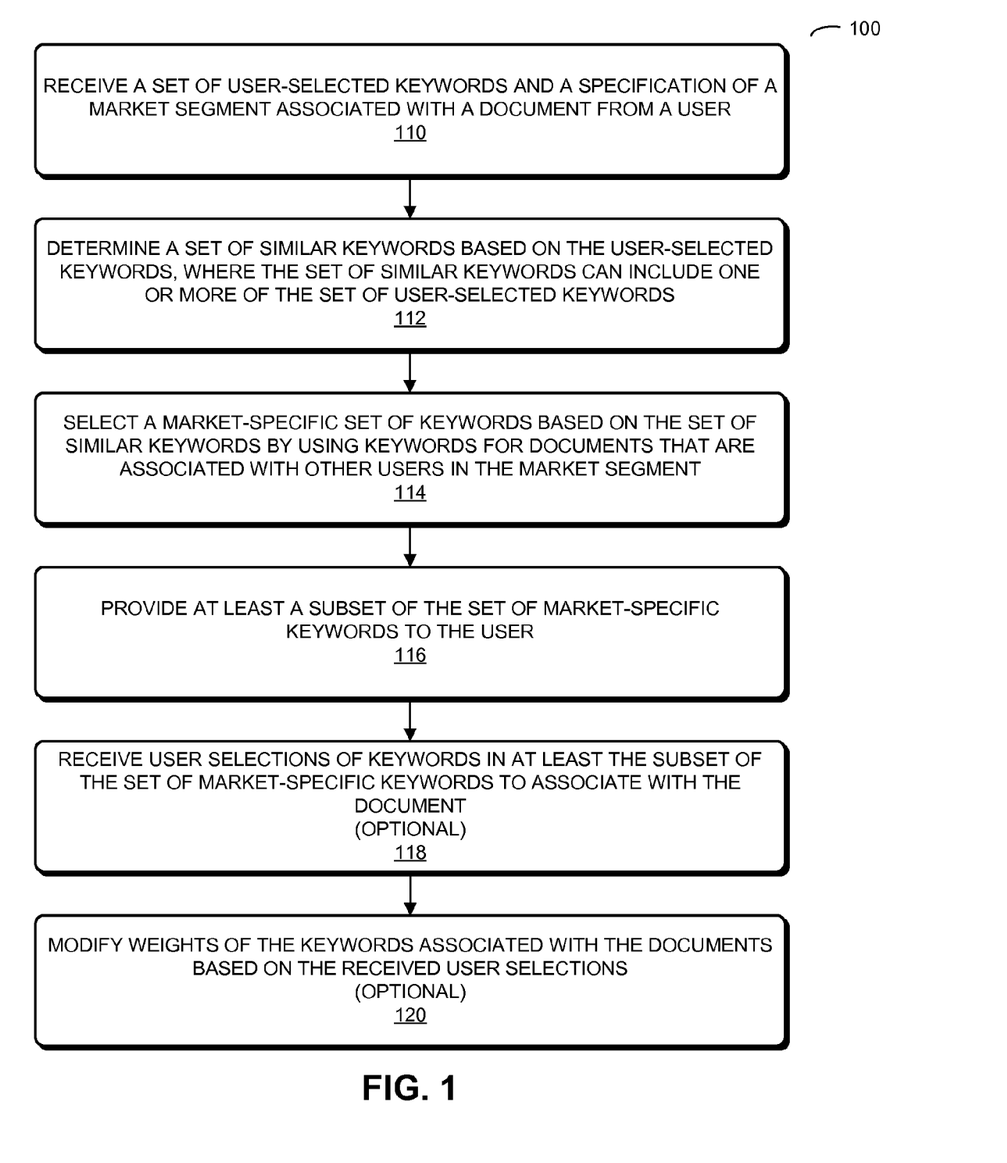
FIG. 1 is a flow chart illustrating a method for providing one or more keywords associated with a document in accordance with an embodiment of the present disclosure.

We now describe embodiments of the method. FIG. 1 presents a flow chart illustrating a method 100 for providing one or more keywords associated with a document, which may be performed by a computer system (such as computer system 200 in FIG. 2 and/or 400 in FIG. 4). During operation, the computer system receives a set of user-selected keywords and a specification of a market segment associated with the document from a user (operation 110). Then, the computer system determines a set of similar keywords based on the user-selected keywords (operation 112), where the set of similar keywords can include one or more of the set of user-selected keywords. For example, the set of similar keywords may include synonyms of, or words that are related to, the set of user-selected keywords.

In some embodiments, determining the set of similar keywords involves performing a filtering operation in which N top-ranked keywords in the set of similar keywords are used in subsequent operations in the method. Alternatively or additionally, determining the set of similar keywords may involve calculating competitiveness scores of the set of similar keywords. For example, a given competitiveness score of a given keyword in the set of similar keywords may be based on a number of users that pay to be associated with the given keyword during searches for documents on a network. Furthermore, calculating the competitiveness scores may involve performing a filtering operation in which keywords in the set of similar keywords that have competitiveness scores in a range of values are used in subsequent operations in the method, where a maximum or a minimum of the competitiveness scores in the range of values is other than a maximum or minimum possible competitiveness score. This filtering operation may reduce a cost of purchasing keywords in at least the set of similar keywords.

Moreover, the computer system may select a market-specific set of keywords based on the set of similar keywords by using keywords for documents that are associated with other users in the market segment (operation 114), where the market-specific set of keywords can include one or more of the user-selected keywords and/or the set of similar keywords. Note that the subset of the set of market-specific keywords may include N top-ranked keywords in the set of market-specific keywords.

Next, the computer system provides at least a subset of the set of market-specific keywords to the user (operation 116).

In some embodiments, the computer system optionally receives user selections of keywords in at least the subset of the set of market-specific keywords to associate with the document (operation 118). These user selections may facilitate a search-engine-determined ranking of the document in response to a search query from another user. Furthermore, the computer system may optionally modify weights of the keywords associated with the documents based on the received user selections (operation 120).

In an exemplary embodiment, a user input five initial keywords and an industry or market segment. For example, the industry may be 'restaurants,' and the five initial keywords include 'Italian,' 'pasta,' 'quality,' 'cheap,' and 'San Jose.' As shown in Table 1, which provides the top-20 keywords in a set of similar keywords, the correlation with similar keywords in a data structure associated with a search engine may be determined based on the five initial keywords to generate the set of similar keywords. Note that the correlation with a given one of the initial keywords may provide a measure of how similar (and, thus, how relevant) an alternative keyword is to the given initial (user-supplied) keyword. This correlation may measure the overlap between the initial keywords and terms in search results provided by the search engine.

TABLE 1

| Keyword | Competitiveness Score | Local Monthly Search Volume | Global Monthly Search Volume |
| --- | --- | --- | --- |
| Italian pasta | 1 | 110,000 | 90,500 |
| Cooking Italian | 0.73 | 110,000 | 110,000 |
| Dessert Italian | 0.53 | 27,100 | 27,100 |
| Italian foods | 1 | 45,100 | 45,100 |
| Italian recipe | 1 | 301,000 | 201,000 |
| Italian food | 1 | 450,000 | 368,000 |
| Italian bread | 0.93 | 74,000 | 74,000 |
| Lasagna pasta | 0.73 | 5400 | 6600 |
| Pasta sauces | 0.86 | 27,100 | 27,100 |
| Rice pasta | 0.73 | 33,100 | 27,100 |
| Cook pasta | 0.73 | 18,100 | 18,100 |
| Pasta sauce | 0.93 | 246,000 | 246,000 |
| Pasta recipe | 1 | 368,000 | 368,000 |
| Cooking pasta | 0.93 | 40,500 | 40,500 |
| Pasta | 1 | 5,000,000 | 7,480,000 |
| Penne pasta | 0.86 | 49,500 | 40,500 |
| Fresh pasta | 0.86 | 40,500 | 40,500 |
| Italian recipes | 1 | 368,000 | 301,000 |
| Italian menus | 0.86 | 9900 | 9900 |
| Pasta recipes | 1 | 368,000 | 450,000 |

As noted previously, the set of similar keywords associated with the search engine may include a large number of results (such as 100,000 keywords). Consequently, the set of similar keywords may be filtered to reduce the number of keywords considered in the remainder of method 100. For example, the top-N keywords in the set of similar keywords may be used, where N may be: 10, 20, 50, 100 or 500.

Because many of the keywords in the set of similar keywords are popular, they may be prohibitively expensive for the user to purchase for use with their web page(s). To address this problem, competitiveness scores may be calculated for the set of similar keywords. The competitiveness score of a given keyword may be based on the number of advertisers bidding for a keyword relative to all other keywords (i.e., how many web pages are ranked for the given keyword as opposed to other keywords that have high correlation). For example, each keyword may be assigned a score between 0 and 1.

To help ensure that the identified keywords are affordable (for example, when the user is a small business owner), the keywords with the top competitiveness scores may be filtered out from the set of similar keywords. For example, the top-N keywords may be inverse ranked based on their competitiveness scores (i.e., from the lowest competitiveness score to the highest competitiveness score), and the keywords at the bottom of this inverse ranking (such as the keywords having competitiveness scores between 0.9 and 1) may be excluded in the subsequent operations in method 100. Thus, the initial keyword 'pasta' may be too broad and expensive to use as an adword. While it may have high correlation and competitiveness scores, the latter may result in its removal from the set of similar keywords.

Then, the industry 'restaurants' and the set of similar keywords may be used to determine the market-specific set of keywords. In particular, the industry and the set of similar keywords may be used to identify keywords in another data structure that are associated with web pages of other users in the industry. For example, the market-specific set of keywords may be determined by ranking the keywords in the other data structure based on how often they are used by the other users in the industry. Table 2 provides the top-20 keywords in a set of market-specific keywords that are selected based on the set of similar keywords in Table 1.

TABLE 2

| Keywords |
| --- |
| Traditional Italian food |
| Best pasta |
| Italian food pasta |
| Popular Italian food |
| Best Italian pasta |
| Traditional Italian recipes |
| Italian gourmet food |
| Italian pastries |
| Pasta whole grain |
| Dessert Italian |
| Pasta dishes |
| Italian meal |
| Italian food products |
| Fresh pasta |
| Best pasta recipe |
| Italian meatballs |
| Pesto pasta recipes |
| Vegetable pasta recipe |
| Fresh pasta recipes |
| Orzo pasta recipes |

Next, the set of market-specific keywords may be filtered to determine the subset of the set of market-specific keywords. For example, the top-M keywords in the set of market-specific keywords may be used in subsequent operations in method 100, where M is 5, 10, 25 or 50. This subset of the set of market-specific keywords may be presented to the user. Table 3 provides a subset of the set of market-specific keywords in Table 2 that can be presented to the user.

TABLE 3

| Keywords |
| --- |
| Traditional Italian food |
| Best pasta |
| Italian food pasta |
| Popular Italian food |
| Best Italian pasta |
| Traditional Italian recipes |
| Italian gourmet food |
| Italian pastries |
| Pasta whole grain |
| Dessert Italian |

After the results are presented, the user may be asked to provide feedback. Specifically, the user may be asked which of the keywords in the subset of the set of market-specific keywords they will use with their web page. If a particular keyword is used by the user, a weight in the other data structure that is associated with this keyword may be incremented. For example, the weight of a given keyword in the other data structure may initially be 1. Each time a user selects the given keyword for use in conjunction with a web page, the weight may be incremented by 2 (thus, the first time the given keyword is used, the weight may be incremented from 1 to 3). These weights may provide an indication of how useful the keywords in the other data structure are to the users. Furthermore, over time, the incremented weights may provide an increasingly accurate indication of the usefulness of the keywords in the other data structure (and, thus, may improve the effectiveness of the set of market-specific keywords that are identified using the other data structure).

Figure 2:
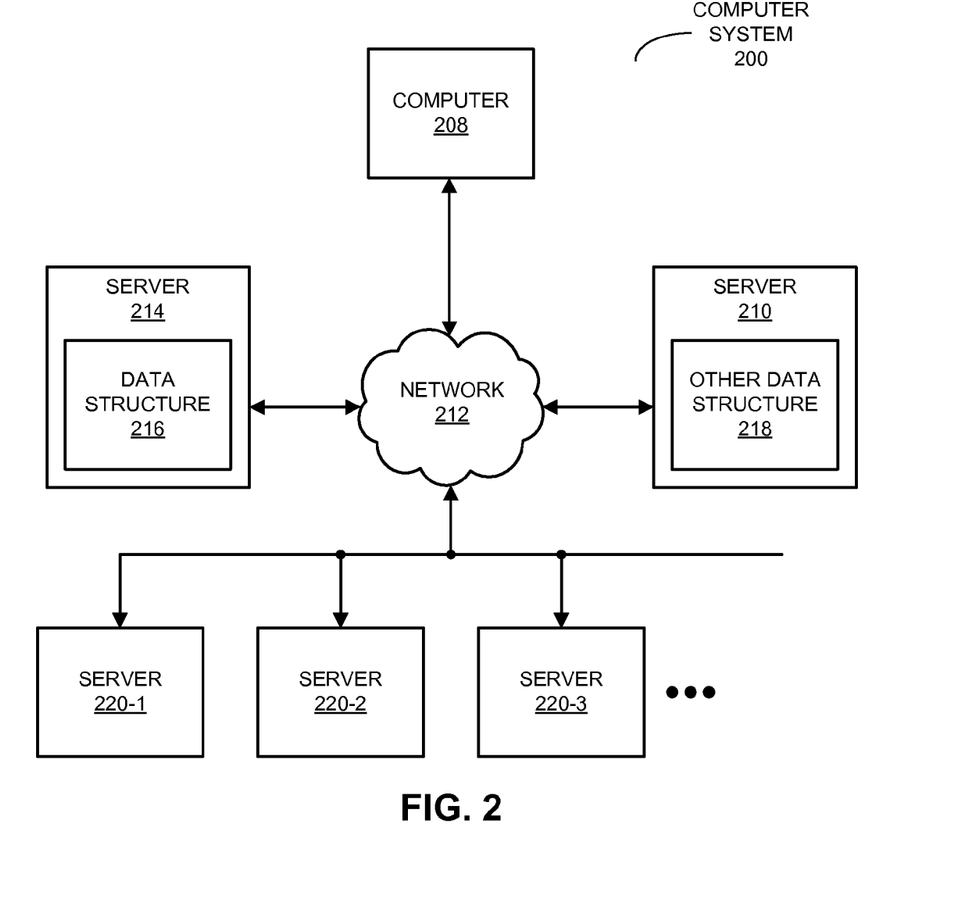
FIG. 2 is a block diagram illustrating a computer system that performs the method of FIG. 1 in accordance with an embodiment of the present disclosure.

We now describe embodiments of the computer system and its use. FIG. 2 presents a block diagram illustrating a computer system 200 that performs method 100 (FIG. 1). In this system, a user of computer 208 may provide the user-selected keywords (i.e., the initial keywords) and the industry. For example, the user may use a web browser that executes in the environment of computer 208 to access a web page or website (via network 212) that is hosted by server 210. After logging in to the web page, and providing the user-selected keywords and the industry, the user may active a 'Get Keywords' icon that is displayed on the web page.

Note that the web browser may be installed and may execute on computer 208. Alternatively or additionally, the user may use an application that is resident on and that executes on computer 208, such as the financial-software application, which is provided by an organization or entity that provides server 210. This application may be a stand-alone application or a portion of another application that is resident on and which executes on computer 208.

In some embodiments, at least a portion of the application may be a software application tool (such as a financial-software application tool) that is embedded in the web page (and which executes in a virtual environment of the web browser). In an illustrative embodiment, the software-application tool is a software package written in: JavaScript™ (a trademark of Sun Microsystems, Inc.), e.g., the software-application tool includes programs or procedures containing JavaScript instructions, ECMAScript (the specification for which is published by the European Computer Manufacturers Association International), VBScript™ (a trademark of Microsoft, Inc.) or any other client-side scripting language. In other words, the embedded software-application tool may include programs or procedures containing: JavaScript, ECMAScript instructions, VBScript instructions, or instructions in another programming language suitable for rendering by the web browser or another client application (such as on computer 208). Thus, the software application may be provided to the user via a client-server architecture.

In response to the information provided by the user and the user request, server 210 may determine at least the subset of the set of market-specific keywords using method 100 (FIG. 1). While performing the associated operations, server 210 may access the data structure 216 on server 214 via network 212. In addition, server 210 may access other data structure 218. As noted previously, the keywords in other data structure 218 may include the keywords associated with web pages of other users in the same industry as the user. These other web pages may be hosted on servers 220.

Then, server 210 may provide the subset of the set of market-specific keywords to the user. For example, the subset of the set of market-specific keywords may be communicated, via network 212, to computer 208, and may be displayed by the web browser.

Subsequently, the user may provide feedback to server 210 via network 212 about which of the keywords he intends to use with his web page. For example, the user may activate radio buttons next to one or more of the displayed keywords in the subset of the set of market-specific keywords. Using this feedback, server 210 may update weights associated with the keywords in other data structure 218.

By improving the rankings of the user's web page or website in search results, method 100 (FIG. 1) can increase customer loyalty to the provider of server 210. Moreover, increasing the user's sales may also increase demand for products and services offered by the provider of server 210 (such as the financial-software application).

Note that the information in computer system 200 (such as data structure 216 and/or other data structure 218) may be stored at one or more locations in computer system 200 (i.e., locally or remotely). Moreover, because this information may be sensitive in nature, it may be encrypted. For example, stored information and/or information communicated via network 212 may be encrypted.

Figure 3:
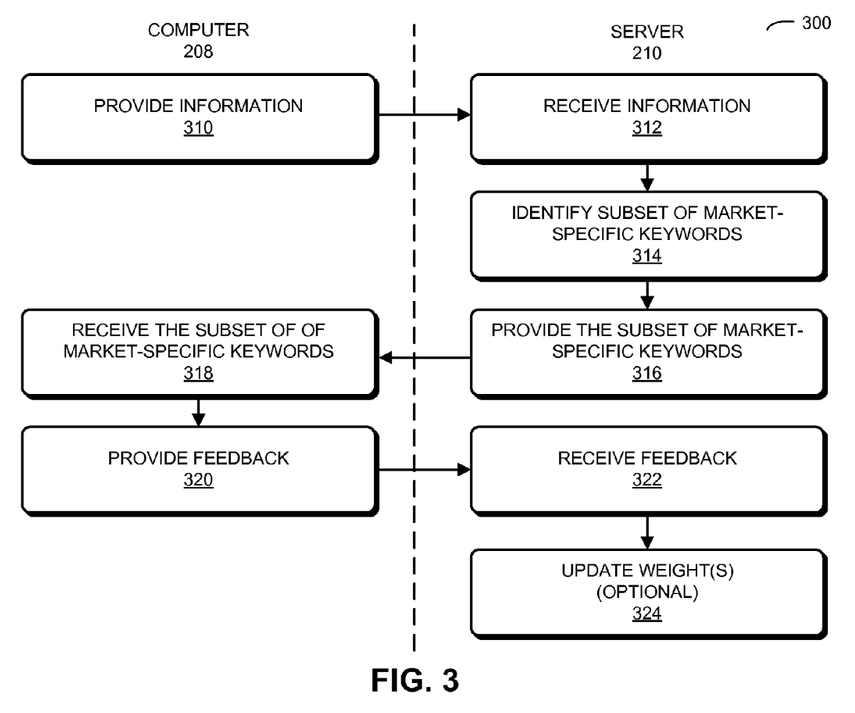
FIG. 3 is a flow chart illustrating the method of FIG. 1 in accordance with an embodiment of the present disclosure.

The interaction between the user of computer 208 and server 210 is summarized in FIG. 3, which presents a flow chart illustrating method 100 (FIG. 1). In particular, the user provides information 310 to server 210, such as the user-selected keywords (i.e., the initial keywords), the industry and the request to 'Get Keywords.' After receiving the information 312, server 210 identifies the subset of the set of market-specific keywords 314, and provides this subset to the user 316. In response to receiving the subset of the set of market-specific keywords 318, the user may provide feedback 320 to server 210 (for example, by selecting one or more of the keywords in the subset of the set of market-specific keywords). Based on the received feedback 322, server 210 may optionally update one or more weights 324 of keywords in the other data structure.

In some embodiments of methods 100 (FIG. 1) and/or 300, there may be additional or fewer operations. Moreover, the order of the operations may be changed and/or two or more operations may be combined into a single operation.

Figure 4:
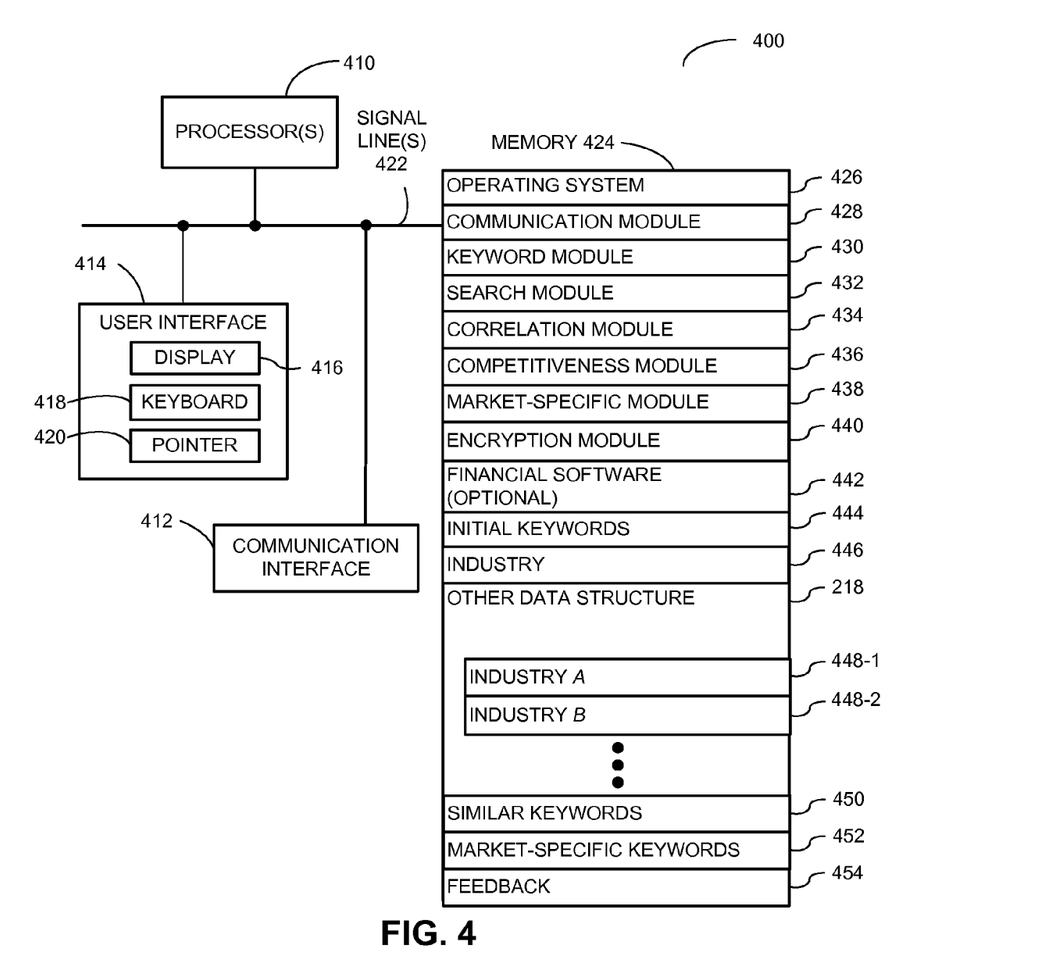
FIG. 4 is a block diagram illustrating a computer system that performs the method of FIG. 1 in accordance with an embodiment of the present disclosure.

We now further describe embodiments of the computer system, such as server 210 (FIG. 2). FIG. 4 presents a block diagram illustrating a computer system 400 that performs method 100 (FIG. 1). Computer system 400 includes one or more processors 410, a communication interface 412, a user interface 414, and one or more signal lines 422 coupling these components together. Note that the one or more processing units 410 may support parallel processing and/or multi-threaded operation, the communication interface 412 may have a persistent communication connection, and the one or more signal lines 422 may constitute a communication bus. Moreover, the user interface 414 may include: a display 416, a keyboard 418, and/or a pointer 420, such as a mouse.

Memory 424 in the computer system 400 may include volatile memory and/or non-volatile memory. More specifically, memory 424 may include: ROM, RAM, EPROM, EEPROM, flash memory, one or more smart cards, one or more magnetic disc storage devices, and/or one or more optical storage devices. Memory 424 may store an operating system 426 that includes procedures (or a set of instructions) for handling various basic system services for performing hardware-dependent tasks. Memory 424 may also store procedures (or a set of instructions) in a communication module 428. These communication procedures may be used for communicating with one or more computers and/or servers, including computers and/or servers that are remotely located with respect to the computer system 400. While not shown in FIG. 4, in some embodiments memory 424 includes a web browser.

Memory 424 may also include multiple program modules (or sets of instructions), including: keyword module 430 (or a set of instructions), search module 432 (or a set of instructions), correlation module 434 (or a set of instructions), competitiveness module 436 (or a set of instructions), market-specific module 438 (or a set of instructions), encryption module 440 (or a set of instructions) and/or optional financial software 442 (or a set of instructions). Note that one or more of these program modules (or sets of instructions) may constitute a computer-program mechanism.

Using keyword module 430, the user may provide initial keywords 444 and industry 446. In response to the user request to 'Get Keywords,' correlation module 434 and/or competitiveness module 436 may determine set of similar keywords 450 based on initial keywords 444 using the data structure (which may be located remotely from computer system 400).

Then, market-specific module 438 may determine set of market-specific keywords 452 based on set of similar keywords 450, industry 446 and other data structure 218. This other data structure may include keywords associated with web pages of multiple users in different industries, such as industry A 448-1 and industry B 448-2.

Furthermore, keyword module 430 may present at least the subset of set of market-specific keywords 452 to the user. Additionally, user feedback 454 may be used to modify weight in other data structure 218.

Note that the user-selected keywords, which are associated with the user's web page or website, may improve rankings of the user's web page or website in response to search results that are generated using search module 432.

In some embodiments, at least some of the information stored in memory 424 and/or at least some of the information communicated using communication module 428 is encrypted using encryption module 440. Furthermore, in some embodiments one or more of the modules in memory 424 may be included in optional financial software 442.

Instructions in the various modules in the memory 424 may be implemented in: a high-level procedural language, an object-oriented programming language, and/or in an assembly or machine language. Note that the programming language may be compiled or interpreted, e.g., configurable or configured, to be executed by the one or more processing units 410.

Although the computer system 400 is illustrated as having a number of discrete items, FIG. 4 is intended to be a functional description of the various features that may be present in the computer system 400 rather than a structural schematic of the embodiments described herein. In practice, and as recognized by those of ordinary skill in the art, the functions of the computer system 400 may be distributed over a large number of servers or computers, with various groups of the servers or computers performing particular subsets of the functions. In some embodiments, some or all of the functionality of the computer system 400 may be implemented in one or more application-specific integrated circuits (ASICs) and/or one or more digital signal processors (DSPs).

Computers and servers in computer systems 200 (FIG. 2) and/or 400 may include one of a variety of devices capable of manipulating computer-readable data or communicating such data between two or more computing systems over a network, including: a personal computer, a laptop computer, a mainframe computer, a portable electronic device (such as a cellular phone or PDA), a server and/or a client computer (in a client-server architecture). Moreover, network 212 (FIG. 2) may include: the Internet, World Wide Web (WWW), an intranet, LAN, WAN, MAN, or a combination of networks, or other technology enabling communication between computing systems.

In exemplary embodiments, the financial-software application (i.e., optional financial software 442) includes: Quicken™ and/or TurboTax™ (from Intuit, Inc., of Mountain View, Calif.), Microsoft Money™ (from Microsoft Corporation, of Redmond, Wash.), SplashMoney™ (from SplashData, Inc., of Los Gatos, Calif.), Mvelopes™ (from In2M, Inc., of Draper, Utah), and/or open-source applications such as Gnucash™, PLCash™, Budget™ (from Snowmint Creative Solutions, LLC, of St. Paul, Minn.), and/or other planning software capable of processing financial information.

Moreover, the financial-software application may include software such as: QuickBooks™ (from Intuit, Inc., of Mountain View, Calif.), Peachtree™ (from The Sage Group PLC, of Newcastle Upon Tyne, the United Kingdom), Peachtree Complete™ (from The Sage Group PLC, of Newcastle Upon Tyne, the United Kingdom), MYOB Business Essentials™ (from MYOB US, Inc., of Rockaway, N.J.), NetSuite Small Business Accounting™ (from NetSuite, Inc., of San Mateo, Calif.), Cougar Mountain™ (from Cougar Mountain Software, of Boise, Id.), Microsoft Office Accounting™ (from Microsoft Corporation, of Redmond, Wash.), Simply Accounting™ (from The Sage Group PLC, of Newcastle Upon Tyne, the United Kingdom), CYMA IV Accounting™ (from CYMA Systems, Inc., of Tempe, Ariz.), DacEasy™ (from Sage Software SB, Inc., of Lawrenceville, Ga.), Microsoft Money™ (from Microsoft Corporation, of Redmond, Wash.), Tally.ERP (from Tally Solutions, Ltd., of Bangalore, India) and/or other payroll or accounting software capable of processing payroll information.

Computer systems 200 (FIG. 2) and/or 400 may include fewer components or additional components. For example, data structure 216 and other data structure 218 in FIG. 2 may be combined into a single data structure. Moreover, two or more components may be combined into a single component, and/or a position of one or more components may be changed. In some embodiments, the functionality of the computer systems 200 (FIG. 2) and/or 400 may be implemented more in hardware and less in software, or less in hardware and more in software, as is known in the art.

Figure 5:
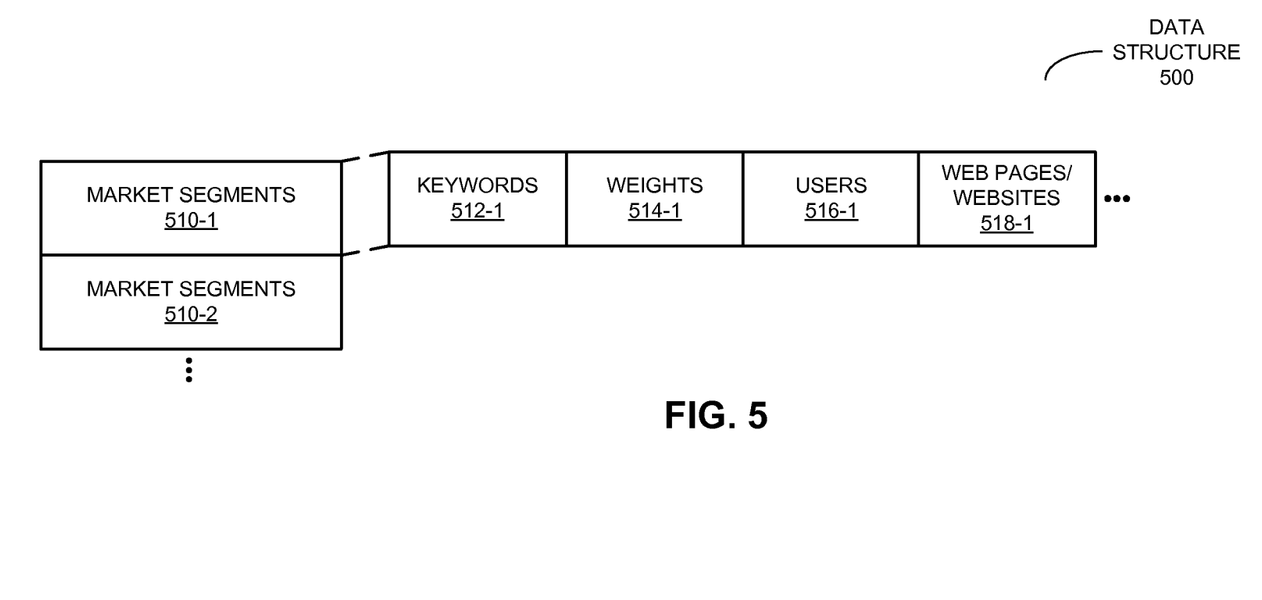
FIG. 5 is a block diagram illustrating a data structure for use in the computer system of FIG. 4 in accordance with an embodiment of the present disclosure.

We now discuss a data structure. FIG. 5 presents a block diagram illustrating a data structure 500 for use in computer system 400 (FIG. 4). This data structure may include keywords for different market segments 510 (i.e., data structure 500 may include other data structure 218 in FIGS. 2 and 4). For example, the keywords in market segment 510-1 may include: keywords 512-1, associated weights 514-1, associated users 516-1, and/or associated web pages or websites 518-1.

In some embodiments of data structure 500, there may be fewer or additional components. Moreover, two or more components may be combined into a single component and/or a position of one or more components may be changed.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer-implemented method for providing one or more targeted keywords associated with a document, comprising:
   receiving a set of user-selected keywords and a specification of a market segment associated with the document from a user, the market segment associated with an industry;
   determining, by computer a set of similar keywords based on the user selected keywords, wherein the determining involves:
   generating a first set of similar keywords, by selecting keywords correlated with the user selected keywords;
   calculating a competitiveness score based on the number of other users bidding for the keyword relative to all other keywords for each keyword in the first set of similar keywords; and
   filtering out a set of keywords with the top competitiveness scores from the set of similar keywords;
   determining a set of weighted market-specific keywords based on the filtered set of similar keywords, the user-selected keywords, and keywords in documents that are associated with other users in the market segment, wherein the set of market specific keywords includes:
   one or more of the keywords in the documents,
   one or more of the user-selected keywords, and
   one or more of keywords from the filtered set of similar keywords;
   providing at least a subset of the set of market-specific keywords to the user, the subset comprising at least the top weighted keywords of the set of market-specific keywords;
   receiving, from the user, a selection of one or more keywords from the provided subset of market specific keywords; and
   incrementing, in a data structure comprising weights associated with keywords, weights for each of the one or more keywords in the received selection of keywords, wherein the weight for each selected keyword is incremented by a predetermined value each time the keyword is selected such that the weight directly relates to a total number of selections of the keyword.

2. The method of claim 1, wherein the document includes one or more web pages.

3. The method of claim 1, wherein the set of similar keywords includes synonyms of, or words that are related to, the set of user-selected keywords.

4. The method of claim 1, wherein determining the set of similar keywords involves performing a filtering operation in which M top-ranked keywords in the set of market-specific keywords are used in subsequent operations in the method.

5. The method of claim 1, wherein a given competitiveness score of a given keyword in the set of similar keywords is based on a number of users that pay to be associated with the given keyword during searches for documents on a network.

6. The method of claim 1, wherein the determining further involves filtering out a set of keywords with the lowest competitiveness scores from the set of similar keywords.

7. The method of claim 1, wherein the filtering operation reduces a cost of purchasing keywords in at least the set of similar keywords.

8. The method of claim 1, wherein the set of market-specific keywords includes N top-ranked keywords in the set of market-specific keywords.

9. The method of claim 1, wherein the received selection of one or more keywords from the provided subset of market-specific keywords facilitate a search-engine-determined ranking of the document in response to a search query from another user.

10. A non-transitory computer-readable medium storing instructions that, when executed by a computer, cause the computer to perform a method of providing one or more targeted keywords associated with a document, the method comprising:
  receiving a set of user-selected keywords and a specification of a market segment associated with the document from a user, the market segment associated with an industry;
  determining, by computer a set of similar keywords based on the user selected keywords, wherein the determining involves:
  generating a first set of similar keywords, by selecting keywords correlated with the user selected keywords;
  calculating a competitiveness score based on the number of other users bidding for the keyword relative to all other keywords for each keyword in the first set of similar keywords; and
  filtering out a set of keywords with the top competitiveness scores from the set of similar keywords;
  determining a set of weighted market-specific keywords based on the filtered set of similar keywords, the user-selected keywords, and keywords in documents that are associated with other users in the market segment, wherein the set of market specific keywords includes:
  one or more of the keywords in the documents,
  one or more of the user-selected keywords, and
  one or more of keywords from the filtered set of similar keywords;
  providing at least a subset of the set of market-specific keywords to the user, the subset comprising at least the top weighted keywords of the set of market-specific keywords;
  receiving, from the user, a selection of one or more keywords from the provided subset of market specific keywords; and
  incrementing, in a data structure comprising weights associated with keywords, weights for each of the one or more keywords in the received selection of keywords, wherein the weight for each selected keyword is incremented by a predetermined value each time the keyword is selected such that the weight directly relates to a total number of selections of the keyword.

11. The computer-readable storage medium of claim 10, wherein the document includes one or more web pages.

12. The computer-readable storage medium of claim 10, wherein the set of similar keywords includes synonyms of, or words that are related to, the set of user-selected keywords.

13. The computer-readable storage medium of claim 10, wherein determining the set of similar keywords involves performing a filtering operation in which M top-ranked keywords in the set of market-specific keywords are used in subsequent operations in the method.

14. The computer-readable storage medium of claim 10, wherein a given competitiveness score of a given keyword in the set of similar keywords is based on a number of users that pay to be associated with the given keyword during searches for documents on a network.

15. The computer-readable storage medium of claim 10, wherein the determining further involves filtering out a set of keywords with the lowest competitiveness scores from the set of similar.

16. The computer-readable storage medium of claim 10, wherein the set of market-specific keywords includes N top-ranked keywords in the set of market-specific keywords.

17. The computer-readable storage medium of claim 10, wherein the received selection of one or more keywords from the provided subset of market-specific keywords facilitate a search-engine-determined ranking of the document in response to a search query from another user.

18. A computer system, comprising:
  a processor;
  memory; and
  a program module for providing one or more targeted keywords associated with a document, wherein the program module is stored in the memory and configurable to be executed by the processor, the program module including:
  instructions for receiving a set of user-selected keywords and a specification of a market segment associated with the document from a user, the market segment associated with an industry;
  instructions for determining, by computer a set of similar keywords based on the user selected keywords, wherein the determining involves:
  generating a first set of similar keywords, by selecting keywords correlated with the user selected keywords;
  calculating a competitiveness score based on the number of other users bidding for the keyword relative to all other keywords for each keyword in the first set of similar keywords; and
  filtering out a set of keywords with the top competitiveness scores from the set of similar keywords;
  instructions for determining a set of weighted market-specific keywords based on the filtered set of similar keywords, the user-selected keywords, and keywords in documents that are associated with other users in the market segment, wherein the set of market specific keywords includes:
  one or more of the keywords in the documents,
  one or more of the user-selected keywords, and
  one or more of keywords from the filtered set of similar keywords;
  instructions for providing at least a subset of the set of market-specific keywords to the user, the subset comprising at least the top weighted keywords of the set of market-specific keywords;

instructions for receiving, from the user, a selection of one or more keywords from the provided subset of market specific keywords; and instructions for incrementing, in a data structure comprising weights associated with keywords, weights for each of the one or more keywords in the received selection of keywords, wherein the weight for each of the one or more keywords in the received selection of keywords, wherein the weight for each selected keyword is incremented by a predetermined value each time the keyword is selected such that the weight directly relates to a total number of selections of the keyword.

\* \* \* \* \*